March 11, 1969    F. A. STEPHENS ET AL    3,432,059
TEATS FOR INFANTS' FEEDING BOTTLES
Filed Sept. 30, 1966
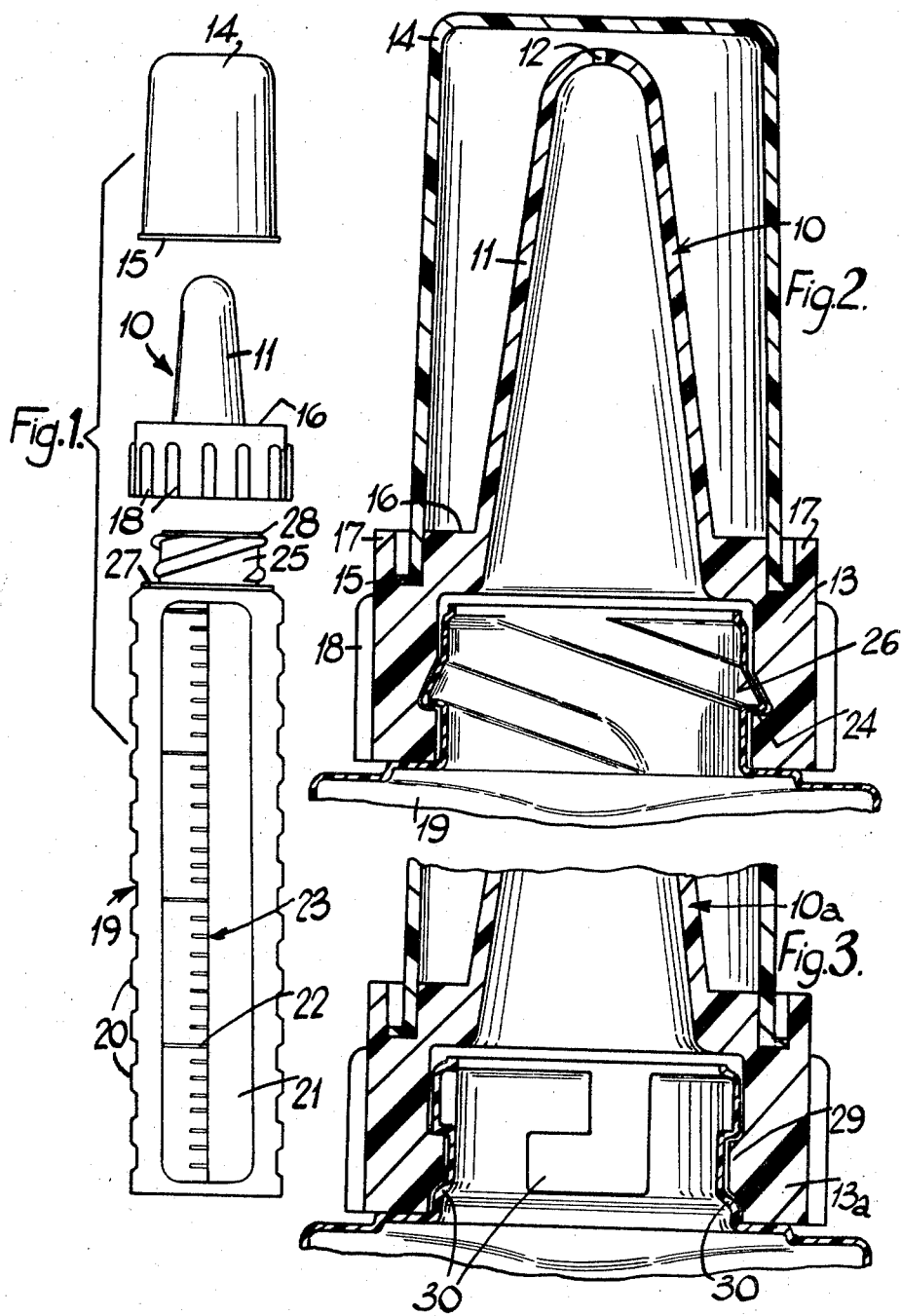

United States Patent Office 3,432,059
Patented Mar. 11, 1969

3,432,059
TEATS FOR INFANTS' FEEDING BOTTLES
Frederick Allen Stephens, Studley, and Arthur Hurst, Earlswood, England; said Stephens assignor to The British Needle Company Limited, Redditch, Worcestershire, England
Filed Sept. 30, 1966, Ser. No. 583,298
Claims priority, application Great Britain, Oct. 20, 1965, 44,423/65
U.S. Cl. 215—11        3 Claims
Int. Cl. A61j 9/00, 11/00

ABSTRACT OF THE DISCLOSURE

A disposable infants' feeding bottle is formed as a thin walled blow moulding in a synthetic plastic material. The bottle has a screw-threaded neck and there is an annular plateau at the juncture of the neck with the body of the bottle. The bottle has a teat comprising a thin walled substantially conical nipple portion integrally connected to a thickened portion formed with an internal screw thread which coacts with the screw thread on the neck of the bottle, the end of said thickened portion sealingly engaging the plateau on the bottle. The thickened portion of the teat has a groove in which a removable cap of rigid synthetic plastic material is inserted to protect the nipple portion of the teat.

---

This invention relates to teats for infants' feeding bottles. It is an object of the invention to provide such a teat in a convenient form.

A teat in accordance with the invention is formed of a suitably flexible material and is provided at its open end with an integral thickened wall portion formed with an internal screw-thread or equivalent formation for the reception of the complementary neck of a feeding bottle.

The invention also resides in the combination of a teat as above defined with a feeding bottle.

Reference will now be made to the accompanying drawings in which:

FIGURE 1 ise an exploded elevation of a combined feeding bottle, teat and cover therefore, FIGURE 2 is an enlarged fragmentary section of the combination shown in FIGURE 1, and FIGURE 3 is a view like FIGURE 2 showing a modified form of the invention.

In the example shown the teat 10 is formed of a synthetic resin material such as ethylene vinyl acetate. The teat has a readily deformable portion 11, which may be of generally conical form, with a relatively thin wall. This portion is formed, at or adjacent the vertex of the cone with one or more perforations 12.

The teat also has a comparatively thickly walled portion 13 at the open end of the conical portion. This thickened portion forms a cap for a feeding bottle and is formed with an internal screw-thread, preferably of the quick-pitch double start type.

The teat is preferably provided with a cover 14 formed, for example, as a moulding in polyethylene. The cover is of cup-shaped form provided around its edge with an outwardly directed rib 15. The open end of the cover is engageable in a groove in a shoulder 16 defined at the juncture of the conical thin-wall portion 11 of the teat and the thick-walled portion 13 of the teat. The groove is positioned on the shoulder to provide a thin annular skirt portion 17 lying outwardly of the groove. When the cover is engaged in the groove the rib 15 deforms the skirt portion 17 to form an outer seal whilst the internal surface of the cover engages the juncture of the wall of the groove with the inner portion of the shoulder 16 to form an inner seal.

The thick-walled portion 13 of the teat also has external ribs 18 extending in directions parallel to the axis of the teat to facilitate turning of the teat on the bottle.

The bottle 19 with which the teat is used is formed as a blow-moulding in a thermoplastic synthetic resin material such as polyvinyl chloride. The body of the bottle is of generally rectangular cross section and the wider sides of the bottle are stiffened by transverse corrugations 20. The narrower sides are stiffened longitudinally by raised up portions 21 marked with scales 22 to indicate the quantity of material in the bottle.

When moulding the bottle moulds separated along the line 23 in FIGURE 1 are used. It will be noted that the particular form of thread used makes the blow moulding technique possible. The flanks 24 of the threads remote from the free end of the neck 25 are inclined at a very steep angle to the axis of the neck, whilst the other flanks 26 are inclined at a very much shallower angle. This enables the relatively thin-walled neck of the bottle to withstand the high localized forces imposed on the threads when the teat is screwed on.

It will also be noted that the free end of the neck is clear of the internal surface of the teat. In order to obtain a seal between the teat and the bottle a plateau 27 is formed at the juncture of the neck 25 of the bottle with the body thereof. This plateau 27 is engaged by the end surface 28 of the thick walled formation of the teat. It will be noted that, with this arrangement the portion 13 of the teat is in compression when in position on the neck. Had the arrangement been such that sealing against the end of the neck 25 occurred parts of the portion 13 would have been in tension and thus likely to yield permanently.

Furthermore a plateau seal arrangement allows a relatively wide-area seal to be obtained. This result cannot be obtained at the free end of the neck without unduly restricting the opening of the neck, thus making filling of the bottle more difficult.

The example of the invention described can be produced in quantity at very low cost. Thus the bottle with its teat and cover can be enonomically disposed of after a single use. The invention is that the bottles should be packed in cartons and then sterilized by irradiation. It will be noted that the rectangular cross-sectional shape of the body of the bottle and the dimensions of the portion 13 of the teat simplify such packing and also result in economy of storage space.

When the sterilized bottles are required for use, for example, in hospitals or nursing homes the feed can be dispensed into the bottle after removal of the teat and cover as a unit. The teat and cover are then replaced until it is required to feed an infant with the bottle. It will be noted that the portion 11 of the teat which the infant takes in its mouth is not exposed between sterilization and final removal of the cover 14. As a result, the risk of infection is minimized.

It is also proposed that bottles as above described should be filled with milk feed or with concentrated liquid or powder feed ready for the addition of sterilized water.

The thread formation on the bottle neck and that in the teat could, of course, be modified somewhat by providing only one of the two parts with a thread proper, the other part merely having projections which co-act with the thread. As shown in FIGURE 3, this ideal could be carried further by using a bayonet type fixing instead of a thread. The internal surface of the portion 13a of the teat 10a would be provided with two or more inwardly projecting portions 29 engageable in a like number of L-shaped grooves 30 in the exterior of the neck of the bottle.

Having thus described our invention what we claim as new and desire to secure by Letters Patent is:

1. The combination of an infant feeding bottle with a teat and a cover therefor, said bottle being formed as a thin walled blow moulding in a synthetic plastic material, and comprising a body, a neck projecting from said body and formed with an external screw thread formation, and a raised plateau at the juncture of the neck of the bottle with the body, said plateau surrounding the neck, said teat comprising a thin walled, conical nipple portion integrally connected to a thickened wall portion formed with an internal screw thread which coacts with the screw thread on the neck of the bottle to hold an end of the thickened wall portion in sealing engagement with the plateau on the bottle, and the teat having a shoulder at the juncture of the nipple portion with said thickened wall portion, and said shoulder being formed with an annular groove defining a flexible outer skirt portion lying outwardly of said groove, said cover being of cup-shaped form of substantially rigid material sealingly engaged in said groove in the teat.

2. The combination claimed in claim 1 in which said cover has an outwardly directed rigid rib about its free edge, said rib deforming the skirt portion of the teat to form an outer seal, whilst the internal surface of the cover engages the juncture of the groove with said shoulder to form an inner seal.

3. The combination claimed in claim 1 in which the thread formation on the neck of the bottle is such that the threads thereof have flanks remote from the free end of the neck inclined at a steep angle to the axis of the neck, and flanks adjacent the free end of the neck inclined at a shallow angle to the axis of the neck, whereby the thin-walled neck of the bottle is enabled to withstand high localized forces imposed on the threads when the teat is screwed on into sealing engagement with the said plateau on the bottle.

References Cited

UNITED STATES PATENTS

| | | | |
|---|---|---|---|
| 2,204,683 | 6/1940 | Lambert. | |
| 2,493,380 | 1/1950 | Bailey | 215—11 |
| 2,579,194 | 12/1951 | Kronish | 128—252 |
| 2,616,581 | 11/1952 | Madsen et al. | 215—11 |
| 2,753,068 | 7/1956 | Robinson | 215—11 |
| 3,112,837 | 12/1963 | Manoyian | 215—11 |
| 3,146,904 | 9/1964 | Hansen et al. | 215—11 |
| 3,272,202 | 9/1966 | Soto. | |
| 3,286,864 | 11/1966 | Patterson | 215—11 |
| 3,293,047 | 12/1966 | Pfister | 215—44 X |
| 3,339,773 | 9/1967 | Stull | 215—43 X |

FOREIGN PATENTS

| | | |
|---|---|---|
| 661,600 | 11/1950 | Great Britain. |

JOSEPH R. LECLAIR, *Primary Examiner.*

U.S. Cl. X.R.

128—252